United States Patent [19]

Nonaka

[11] Patent Number: 4,512,004
[45] Date of Patent: Apr. 16, 1985

[54] APPARATUS FOR OPTICALLY REPRODUCING AN INFORMATION SIGNAL RECORDED ON A RECORD DISC

[75] Inventor: Chiaki Nonaka, Yokohama, Japan

[73] Assignee: Sony Corporation, Tokyo, Japan

[21] Appl. No.: 460,389

[22] Filed: Jan. 24, 1983

[30] Foreign Application Priority Data

Jan. 24, 1982 [JP] Japan .................................. 57-9404

[51] Int. Cl.³ .............................................. G11B 7/00
[52] U.S. Cl. ....................................... 369/45; 369/46
[58] Field of Search .................. 358/342, 907; 369/45, 369/43, 44, 46; 250/201

[56] References Cited

U.S. PATENT DOCUMENTS 4,163,149  7/1979  Sawano et al. .................... 369/45 X
4,243,848  1/1981  Utsumi ................................. 369/45

Primary Examiner—Robert L. Richardson
Attorney, Agent, or Firm—Lewis H. Eslinger; Alvin Sinderbrand

[57] ABSTRACT

An optical reproducing apparatus includes an optical pickup device which projects a laser beam onto a record disc having an information signal recorded in a plurality of record tracks thereon and which reproduces the information signal from the modulated laser beam reflected from the record disc, the optical pickup device including an objective lens movable in directions toward and away from the record disc to focus the projected laser beam onto the record disc; a focus servo control arrangement which moves the objective lens in the directions toward and away from the record disc in response to a focusing error signal which, in turn, is produced in response to the modulated laser beam, so as to focus the projected laser beam onto the record disc; a laser beam tracking device which rapidly moves the laser beam projected onto the record disc, during a search mode of operation, in a direction transverse to the record tracks to a desired position with respect to the record disc; a track jump signal generating circuit which produces a track jump signal in response to a track jump command signal to control the laser beam tracking device to rapidly move the projected laser beam to the desired position; and a current divider circuit which reduces the level of the focusing error signal, at least during the duration of the track jump signal, in response to the track jump command signal.

11 Claims, 17 Drawing Figures

FIG. 5
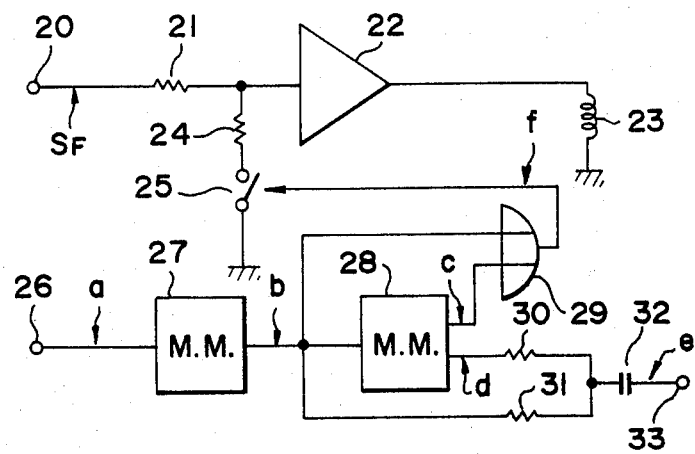
FIG. 6A
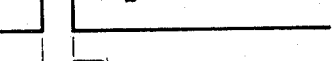
FIG. 6B
FIG. 6C
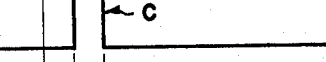
FIG. 6D
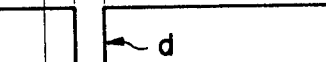
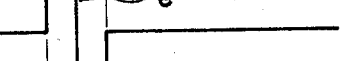
FIG. 6E
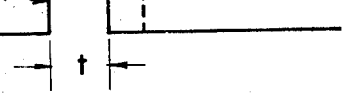
FIG. 6F

APPARATUS FOR OPTICALLY REPRODUCING AN INFORMATION SIGNAL RECORDED ON A RECORD DISC

BACKGROUND OF THE INVENTION

This invention relates generally to optical reproducing apparatus and, more particularly, is directed to optical reproducing apparatus of the type adapted to rapidly move an optical pickup device thereof to a desired position on a record disc during a search operation.

Apparatus is known in the art for optically reproducing an information signal, such as a frequency modulated (FM) video signal or a pulse code modulated (PCM) audio signal, from a record disc during rotation of the latter. With such apparatus, an optical pickup device is positioned below the record disc and projects a laser beam onto the disc. The laser beam is modulated by the information recorded on the disc in the form of small pits arranged in a spiral track or in concentric tracks, and the modulated laser beam is reflected from the underside of the disc back to the optical pickup device which produces an output signal in response to the modulated laser beam and which supplies such signal to further processing circuitry for separating the information therefrom.

The optical pickup device generally includes an objective lens which is movable in the direction of its optical axis toward or away from the record disc to focus the projected laser beam onto the record disc. A lens driving mechanism is also provided for applying an electromagnetic force, in response to the unfocused condition of the modulated laser beam reflected from the disc, to move the objective lens in the direction of its optical axis and thereby provide a focusing servo control arrangement for maintaining correct focus of the laser beam projected onto the record disc. In order to provide correct tracking of the laser beam onto the center of each record track, a movable mirror is interposed in the path of the light beam projected onto the disc for deflecting the light beam in a direction transverse to each respective record track so that the laser beam is always projected onto the center of each record track. During the normal reproducing mode of operation of the optical reproducing apparatus, a tracking error signal is produced in response to the modulated laser beam reflected from the record disc. A mirror driving mechanism applies an electromagnetic force to the movable mirror, in response to the tracking error signal, to provide a tracking servo control arrangement for maintaining correct tracking of each respective record track by the optical pickup device.

In addition, a drive mechanism is provided for moving the optical pickup device linearly in the radial direction of the record disc, that is, in a direction transverse to the record tracks, from the inner or outer periphery of the record disc in correspondence with rotation thereof. For example, the drive mechanism may comprise suitable gearing and a drive motor. Thus, the drive mechanism continuously moves the optical pickup device in the radial direction of the record disc as the latter is rotated at a predetermined constant linear velocity or a predetermined constant angular velocity, whereby the optical pickup device continuously scans the record tracks of the record disc.

It has been proposed to also detect address information recorded on the record disc for performing a search or track jump operation so that reproduction at a desired position can be easily and quickly achieved. In particular, a selected address corresponding to the desired position is preset, and the drive mechanism is controlled by a track jump signal to move the pickup device rapidly across the record tracks to the desired position on the record disc corresponding to the selected address. In addition to, or alternatively, during the search mode of operation, the mirror driving mechanism may generate another electromagnetic force, in response to the track jump signal, to control the movable mirror to rapidly move the projected laser beam across a plurality of record tracks to the desired position on the record disc.

However, it is to be appreciated that, during such rapid movement of the projected laser beam across or transverse to the record tracks, a large focusing error is detected. In response thereto, the aforementioned focus servo control arrangement responds to detected rapid variations in the focused state of the laser beam reflected from the record disc to control the objective lens so that the latter rapidly moves or oscillates toward and away from the record disc to compensate for such detected variations. As a result, a large vibratory movement of a portion of the structure supporting the objective lens occurs, resulting in a harsh noise being produced by the objective lens.

OBJECTS AND SUMMARY OF THE INVENTION

Accordingly, it is an object of this invention to provide optical reproducing apparatus that avoids the above-described difficulties encountered with the prior art.

More particularly, it is an object of this invention to provide optical reproducing apparatus for preventing large vibratory movement of the objective lens used for focusing the projected light beam onto the record disc, during a search mode of operation.

It is another object of the present invention to provide optical reproducing apparatus for reducing the gain of the focusing error signal generated to restrict movement of the objective lens during a search mode operation.

In accordance with an aspect of this invention, apparatus for reproducing an information signal recorded in at least one record track on a record disc, includes optical pickup means for projecting a light beam onto the record disc to be modulated by the information signal recorded thereon and for reproducing the information signal in response to the modulated light beam, the optical pickup means including lens means for focusing the projected light beam onto the record disc; focus control means for moving the lens means in response to a focusing error signal produced in response to the modulated light beam to focus the projected light beam onto the record disc; light beam tracking means for rapidly moving the light beam projected onto the record disc in a direction transverse to the at least one record track to a desired position with respect to the record disc, in response to a track jump command signal; and gain control means for reducing the level of the focusing error signal in response to the track jump command signal.

The above, and other, objects, features and advantages of the present invention will become readily apparent in the following detailed description thereof which is to be read in connection with the accompanying drawings.

BRIEF DESCRIPTION OF THE DRAWINGS

FIG. 5 is a circuit-wiring, block diagram of a gain control circuit of optical reproducing apparatus according to one embodiment of the present invention; and FIGS. 6A-6F are waveform diagrams used for explaining the operation of the gain control circuit of FIG. 5.

DETAILED DESCRIPTION OF A PREFERRED EMBODIMENT

Figure 1A:
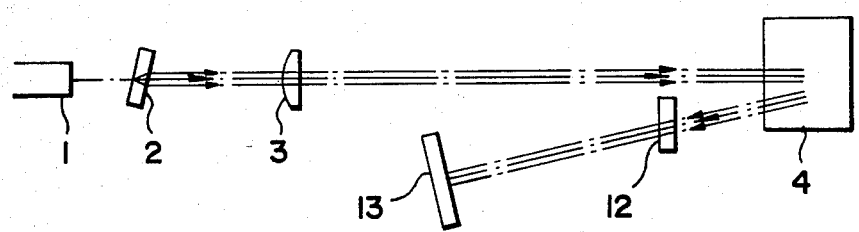
FIG. 1A is a schematic side plan view of a portion of an optical reproducing apparatus with which the present invention can be used.
Figure 1B:
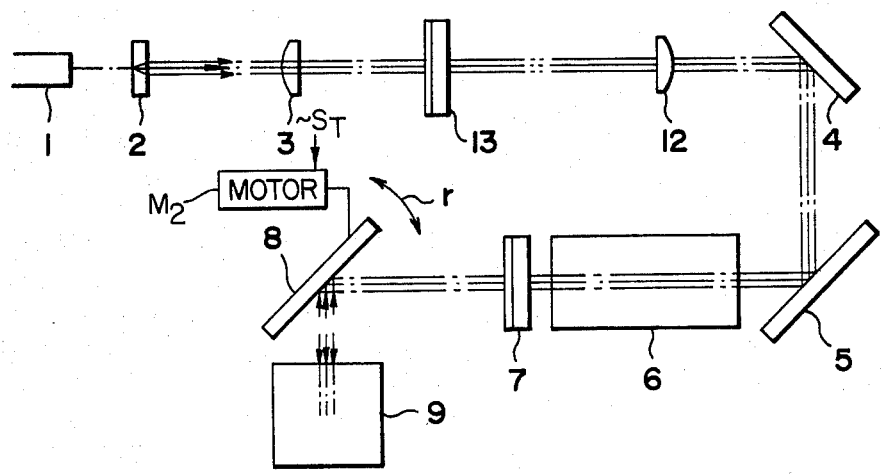
FIG. 1B is a schematic bottom plan view of another portion of the optical reproducing apparatus of FIG. 1A with which the present invention can be used.
Figure 1C:
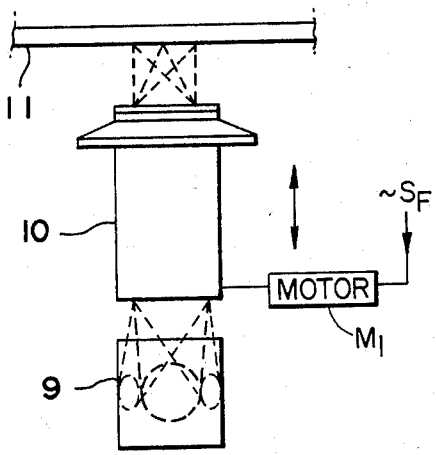
FIG. 1C is a schematic elevational view of another portion of the optical reproducing apparatus of FIG. 1A with which the present invention can be used.

Referring to the drawings in detail, and initially to FIGS. 1A-1C thereof, an optical reproducing apparatus with which the present invention can be used includes an optical pickup device having a laser source 1 which emits a laser light beam through a grating 2 and a spot lens 3 onto a fixed mirror 4. The latter fixed mirror 4 reflects the laser beam onto another fixed mirror 5 where it is again reflected through a Wollaston prism 6 and a quarter-wave plate 7 onto a movable mirror 8, thereby forming a substantially U-shaped path of travel for the laser beam. Mirror 8 is mounted for angular displacement about an axis, indicated by the double-headed arrow r in FIG. 1B and is controlled by a conventional mirror driving mechanism in response to a tracking error signal to maintain correct tracking of the laser beam onto the center of each record track being scanned and to thereby perform a tracking servo control operation. The laser beam reflected from movable mirror 8 is then reflected by a fixed mirror 9 through an objective lens 10, as shown in FIG. 1C, the latter objective lens 10 functioning to correctly focus the laser beam onto a record disc 11. Objective lens 10 is adapted to move in a direction toward and away from the record disc, that is, in the direction of its optical axis, to focus the laser beam onto the record disc. In this regard, a lens driving mechanism $M_1$ (FIG. 1C) is provided for moving objective lens 10 in the direction of its optical axis, in response to the modulated light beam reflected from the record disc, to maintain the laser beam projected onto the record disc in a correctly focused state.

It is to be appreciated that rotating disc 11 has information recorded therein in the form of pits in a plurality of concentric record tracks or in a spiral record track. Hereinafter, although a single spiral track literally contains only one track, it will be considered, in the specification and claims, to be the equivalent of and contain a plurality of concentric record tracks for movement of the projected laser beam in the direction transverse to the record tracks. The laser beam projected onto the underside of the record disc 11 is reflected therefrom and modulated with the information signal recorded in the record track then being scanned thereby as record disc 11 rotates. The reflected light beam is returned in a path extending through objective lens 10 and then reflected by fixed mirror 9 and movable mirror 8 through quarter-wave plate 7 and Wollaston prism 6. As a result of travel of the light beam back through quarter-wave plate 7 and Wollaston prism 6, the modulated laser beam is reflected from mirrors 5 and 4 to a cylindrical lens 12, as shown in FIGS. 1A and 1B, which extends in a path different from that including lens 3. The laser beam travels through cylindrical lens 12 to a light receiving device 13 which includes a plurality of photo-detectors, such as photo-diodes, responsive to the reflected laser beam, and circuitry controlled by the photo-detectors to produce the reproduced information signal, a tracking error signal and a focusing error signal.

Figure 2:
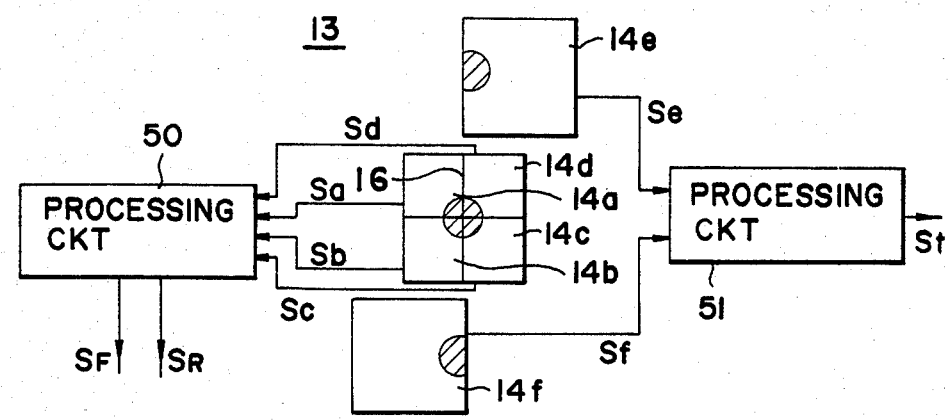
FIG. 2 is a schematic view illustrating the arrangement of photo-detectors that can be used in the optical reproducing apparatus of FIGS. 1A-1C and a block diagram of circuitry that can be used therewith.
Figure 3A:
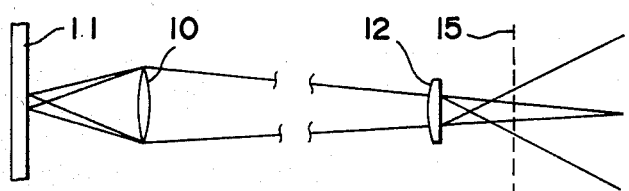
FIG. 3A is a schematic plan view of a portion of the optical reproducing apparatus of FIGS. 1A-1C, illustrating the condition where the laser beam projected onto the record disc is focused in front of the record disc.
Figure 3B:
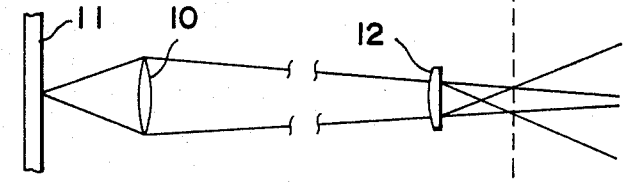
FIG. 3B is a schematic plan view of a portion of the optical reproducing apparatus of FIGS. 1A-1C, illustrating the condition where the laser beam projected onto the record disc is correctly focused on the record disc.
Figure 3C:
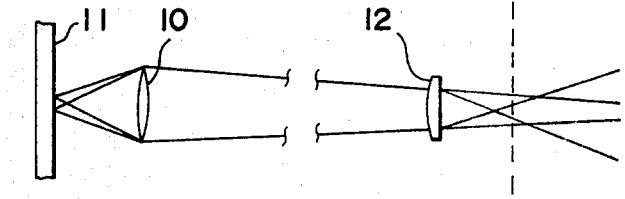
FIG. 3C is a schematic plan view of a portion of the optical reproducing apparatus of FIGS. 1A-1C, illustrating the condition where the laser beam projected onto the record disc is focused behind the record disc.
Figure 4A:
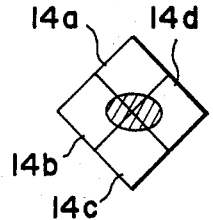
FIG. 4A is a schematic plan view, illustrating the pattern of the spot formed by the modulated laser beam reflected from the record disc onto the photo-detectors of FIG. 2 and corresponding to the condition of FIG. 3A.
Figure 4B:
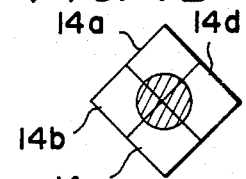
FIG. 4B is a schematic plan view, illustrating the pattern of the spot formed by the modulated laser beam reflected from the record disc onto the photo-detectors of FIG. 2 and corresponding to the condition of FIG. 3B.

As shown in FIG. 2, light receiving device 13 may comprise four photo-detectors 14a, 14b, 14c and 14d arranged in the same plane, indicated by the dashed line 15 in FIGS. 3A-3C, as four contiguous light receiving quadrants. In this manner, photo-detectors 14a and 14c are positioned opposite to each other and photo-detectors 14b and 14d are also positioned opposite to each other. When the laser beam is correctly focused on record disc 11, as shown in FIG. 3B, the modulated laser beam reflected from record disc 11 forms a circular light spot on photo-detectors 14a-14d, as indicated in FIG. 4B. In other words, if photo-detectors 14a-14d are arranged as four light receiving quadrants, the center of the circular light spot is coincident with the center formed by the intersection of the contiguous edges of photo-detectors 14a-14d. Thus, when objective lens 10 correctly focuses the laser beam onto record disc 11, all four photo-detectors 14a, 14b, 14c and 14d receive equal amounts of light so that the levels of the output signals $S_a$, $S_b$, $S_c$ and $S_d$, respectively, therefrom are equal.

Figure 4C:
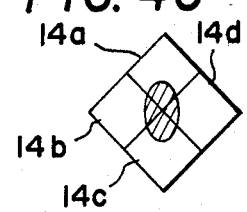
FIG. 4C is a schematic plan view, illustrating the pattern of the spot formed by the modulated laser beam reflected from the record disc onto the photo-detectors of FIG. 2 and corresponding to the condition of FIG. 3C.

On the other hand, when the laser beam projected onto record disc 11 is not focused, unequal amounts of light are reflected back to the different photo-detectors 14a–14d. For example, when objective lens 10 is moved too far from record disc 11 such that the laser beam is focused in front of record disc 11, as shown in FIG. 3A, the astigmatism of cylindrical lens 12 results in the reflected light beam forming an elliptical light spot on photo-detectors 14a–14d, for example, with the major axis of the elliptical light spot extending in the direction between opposing photo-detectors 14b and 14d, as shown in FIG. 4A. It is to be appreciated, that in this case, the amount of light falling on photo-detectors 14b and 14d is greater than the amount of light falling on photo-detectors 14a and 14c. In this regard, the levels of output signals $S_b$ and $S_d$ are greater than the levels of output signals $S_a$ and $S_c$. On the other hand, when objective lens 10 is positioned too close to record disc 11, the laser beam projected through objective lens 10 is focused behind record disc 11, as shown in FIG. 3C. In this case, the modulated light beam reflected onto photo-detectors 14a–14d forms an elliptical light spot with the major axis of the ellipse extending in the direction between photo-detectors 14a and 14c, as shown in FIG. 4C. Since the amount of light falling on photodetectors 14a and 14c is greater than the amount of light falling on photo-detectors 14b and 14d, the levels of output signals $S_a$ and $S_c$ are greater than the levels of output signals $S_b$ and $S_d$.

Output signals $S_a$–$S_d$ are supplied to a processing circuit 50 which reproduces the information signal $S_R$ and focusing error signal $S_F$ in response thereto. More particularly, processing circuit 50 reproduces information signal $S_R$ in accordance with the following equation:

$$S_a+S_b+S_c+S_d=S_R \qquad (1).$$

In like manner, processing circuit 50 produces focusing error signal $S_F$ in response to the following equation:

$$(S_a+S_c)-(S_b+S_d)=S_F \qquad (2),$$

the focusing error signal $S_F$ indicating the focused condition of the laser beam projected onto record disc 11 and being supplied to a lens driving mechanism to control movement of objective lens 10 in the direction toward and away from record disc 11 to correct for any unfocused condition. Thus, when the laser beam is correctly focused onto record disc 11, as shown in FIG. 3B, focusing error signal $S_F$ has a zero value. On the other hand, when objective lens 10 is moved too close to record disc 11, as shown in FIG. 3C, focusing error signal $S_F$ has a positive polarity, and when objective lens 10 is positioned too far from record disc 11, as shown in FIG. 3C, focusing error signal $S_F$ has a negative polarity. In this regard, when focusing error signal $S_F$ is supplied to the aforementioned lens driving mechanism to move objective lens 10, a focusing servo control operation is performed, whereby the laser beam projected onto record disc 11 is maintained in a properly focused state.

As shown in FIG. 2, light receiving device 13 includes two additional photo-detectors 14e and 14f positioned in front of and behind photo-detectors 14a–14d and positioned symmetrically at opposite sides of a median line 16 of the four-quadrant arrangement of photo-detectors 14a–14d, with median line 16 being constituted by the contiguous edges of photo-detectors 14a and 14d and photo-detectors 14b and 14c. Photodetectors 14e and 14f constitute part of a tracking servo control arrangement. More particularly, grating 2 through which the laser beam from laser source 1 is projected, forms two auxiliary light beams, in addition to the main laser beam used for reproduction, the auxiliary laser beams being arranged parallel to the main laser beam. The auxiliary laser beams are also projected onto record disc 11 to form auxiliary spots thereon at positions in advance of and behind, respectively, the position at which the spot formed by the main laser beam is projected onto record disc 11, considered in the direction along each record track. Further, the auxiliary spots are positioned on opposite sides of a center line of the spot formed by the main laser beam which is parallel to the record track then being scanned by the main laser beam. The auxiliary laser beams are also reflected from record disc 11 and fall upon photo-detectors 14e and 14f, respectively, of light receiving device 13. In response thereto, photo-detectors 14e and 14f produce output signals $S_e$ and $S_f$, respectively, which are supplied to a processing circuit 51, as shown in FIG. 2. In response thereto, processing circuit 51 produces a tracking error signal $S_T$ corresponding to deviation of the point of impingement of the focused main laser beam with respect to the center of the record track then being scanned on record disc 11 and determined by the following equation:

$$S_e-S_f=S_T \qquad (3).$$

Tracking error signal $S_T$ is supplied to a mirror driving mechanism $M_2$ (FIG. 1B) for angularly moving movable mirror 8 to perform a tracking servo control operation, that is, to maintain the main laser beam substantially centered with respect to the record track then being scanned. It is to be appreciated that tracking error signal $S_T$ has a zero value when the main laser beam correctly tracks the center of the record track then being scanned. If the main laser beam erroneously tracks a record track, the tracking error signal $S_T$ has a level and polarity corresponding to the amount and direction of such tracking error and is supplied to mirror driving mechanism for correcting such tracking error.

With the above-described apparatus, it may be desirable to rapidly move the projected laser beam to a desired position on the record disc to thereby perform a search or track jump operation. However, during such search or track jump operation, the focus servo control arrangement previously described attempts to maintain the projected laser beam in a focused condition. As a result, the lens driving mechanism for objective lens 10 moves objective lens 10 and a portion of the support therefor with a large vibratory motion toward and away from record disc 11 to focus the projected laser beam, whereby movement of the support results in the generation of a harsh noise.

Referring now to FIG. 5, a portion of an optical reproducing apparatus according to the present invention that substantially reduces the harsh noise created by the large vibratory motion of objective lens 10 and its support during a search operation will now be described. As shown therein, focusing error signal $S_F$ from processing circuit 50, (FIG. 2) is supplied from an input terminal 20 to a focusing servo control amplifier 22 through a resistor 21. In response thereto, focusing servo control amplifier 22 supplies a control current to a coil 23 of, for example, a drive motor of the lens driving mechanism, for moving objective lens 10 in the direction of its optical axis, that is, toward and away from record disc 11 to maintain the projected laser beam onto the disc in a focused condition. In other words, resistor 21, focusing servo control amplifier 22 and coil 23 form part of the focusing servo control arrangement previously described.

In accordance with the present invention, a resistor 24 is connected at one end between resistor 21 and the input of focusing servo control amplifier 22 and is connected at its opposite end to ground through a switch 25. It is to be appreciated that, when switch 25 is closed, focusing error signal $S_F$ supplied to input terminal 20 is divided by resistors 21 and 24 and is thereby supplied to focusing servo control amplifier 22 with a reduced level. As will be described in greater detail hereinafter, switch 25 is closed or turned ON during a search operation so that the control current supplied by focusing servo control amplifier 22 to coil 23 is greatly reduced to thereby greatly reduce or restrict the vibratory motion of objective lens 10 during such search operation.

More particularly, when it is desired to institute a search operation, a track jump command signal a, as shown in FIG. 6A, from a system control circuit (not shown) is supplied through an input terminal 26 to a monostable multivibrator 27 which is triggered by the rising or positive-going edge of track jump command signal a to produce a pulse signal b, as shown in FIG. 6B, having a predetermined pulse width. Pulse signal b from monostable multivibrator 27 is supplied to another monostable multivibrator 28 which is triggered by the falling or negative-going edge of pulse signal b to produce a pulse signal c (FIG. 6C) having a predetermined pulse width and an inverted pulse signal d (FIG. 6D) which is the inverted form of pulse signal c. Pulse signal b from monostable multivibrator 27 is also supplied through a resistor 31 to a capacitor 32 and inverted pulse signal d, which follows pulse signal b in time, is supplied through a resistor 30 also to capacitor 32. Accordingly, pulse signal b and inverted pulse signal d are combined at capacitor 32 to form a track jump signal e (FIG. 6E) which is supplied to an output terminal 33 for controlling, for example, the mirror driving mechanism to rapidly move the projected laser beam across or transverse to the record tracks on disc 11. In such case, pulse signal b from monostable multivibrator 27 functions as a drive pulse signal which is supplied to the mirror driving mechanism to rapidly rotate mirror 8 about its axis so as to rapidly move the projected laser beam toward the desired position on the record disc. Inverted pulse signal d which follows pulse signal b functions as a brake signal for braking or slowing down the rotation of mirror 8 about its axis until the projected laser beam is positioned at the desired position on record disc 11. Thereafter, the aforementioned tracking control operation is formed.

In order to prevent large vibratory motion of objective lens 10 during such movement of the projected laser beam across or transverse to the record tracks during a search operation, pulse signal b from monostable multivibrator 27 is supplied to one input of an OR gate 29, and pulse signal c which follows pulse signal b in time, from monostable multivibrator 28, is supplied to another input of OR gate 29. As a result, OR gate 29 produces a switch control pulse signal f, as shown in FIG. 6F, having a period or duration t equal to the combined periods or durations of pulse signals b and c.

Pulse signal f is supplied to switch 25 to control the latter during the time period t when pulse signal f is at its high or logic "1" level, as shown in FIG. 6F, to close or turn ON switch 25, and thereby reduce the level of focusing error signal $S_F$ supplied to focusing servo control amplifier 22. As a result, during the search operation when pulse signal f is at a high or "1" level, switch 25 is turned ON to reduce the gain of focusing error signal $S_F$ supplied to focusing servo control amplifier 22 to thereby reduce the large vibratory motion of objective lens 10 and to substantially reduced the harsh noise produced by such large vibratory motion.

It is to be appreciated that the projected laser beam may still move in a search mode, that is, relatively rapidly, even after brake pulse signal d is terminated. In such case, in order to avoid the undesirable harsh noise caused by the large vibratory motion of objective lens 10, it may be sufficient to enlarge the pulse width of pulse signal f to exceed the duration of track jump signal e, as indicated in the broken line in FIG. 6F.

Although one embodiment of the present invention has been described with respect to FIGS. 5 and 6A–6F, various modifications may be made by one of ordinary skill in the art. For example, the output signal from focusing servo control amplifier 22 may be reduced instead, or a variable gain amplifier may be used as the focusing servo control amplifier and the gain thereof controlled in response to pulse signal f shown in FIG. 6F.

Having described a specific preferred embodiment of the invention with reference to the accompanying drawings, it is to be understood that the present invention is not limited to that precise embodiment and that various changes and modifications may be effected therein by one skilled in the art without departing from the scope or spirit of the invention as defined in the appended claims.

What is claimed is:

1. Apparatus for reproducing an information signal recorded in at least one record track on a record disc, comprising:

optical pickup means for projecting a light beam onto said record disc to be modulated by said information signal recorded therein and for reproducing said information signal in response to said modulated light beam, said optical pickup means including lens means for focusing said projected light beam onto said record disc;

focus control means for moving said lens means in response to a focusing error signal produced in response to said modulated light beam so as to focus said projected light beam onto said record disc;

light beam tracking means for rapidly moving said light beam projected onto said record disc in a direction transverse to said at least one record track to a desired position with respect to said record disc, in response to a track jump command signal; and gain control means for reducing the level of said focusing error signal in response to said track jump command signal.

2. Apparatus according to claim 1; in which said light beam tracking means includes optical reflecting means for moving said light beam projected onto said record disc in said direction transverse to said at least one record track and driving means for controlling said optical reflecting means to rapidly move said light beam projected onto said record disc in said direction transverse to said at least one record track to said desired position with respect to said record disc, in response to said track jump command signal.

3. Apparatus according to claim 1; further including track jump signal generating means for producing a track jump signal, comprising a drive pulse signal followed by a brake pulse signal, in response to said track jump command signal; and in which said gain control means reduces the level of said focusing error signal at least during the duration of said track jump signal.

4. Apparatus according to claim 3; in which said track jump signal generating means includes first multivibrator means for producing said drive pulse signal having a first polarity, in response to said track jump command signal, second multivibrator means for producing said brake pulse signal having a second polarity opposite to said first polarity in response to said drive signal signal, and combining means for combining said drive pulse signal and said brake pulse signal to form said track jump signal.

5. Apparatus according to claim 4; in which said second multivibrator means further produces a third pulse signal following said drive pulse signal, said third pulse signal having a duration at least equal to the duration of said brake pulse signal and having said first polarity, and in which said gain control means includes gain reduction means for reducing the level of said focusing error signal and control means for controlling said gain reduction means to reduce the level of said focusing error signal in response to said drive pulse signal and said third pulse signal.

6. Apparatus according to claim 5; in which said gain reduction means includes current divider means adapted to be connected to said focus control means for reducing the gain of said focusing error signal supplied thereto, and said gain control means further includes switch control means for producing a switch control signal in response to said drive pulse signal and said third pulse signal and switch means for connecting said current divider means to said focus control means in response to said switch control signal so as to reduce the level of said focusing error signal.

7. Apparatus according to claim 6; in which said switch control means includes OR gate means having first and second inputs supplied with said drive pulse signal and said third pulse signal, respectively, to produce said switch control signal.

8. Apparatus according to claim 1; in which said gain control means includes first multivibrator means for producing a first pulse signal having a first polarity, in response to said track jump command signal, second multivibrator means for producing a second pulse signal following said first pulse signal and having said first polarity, in response to said drive pulse signal, and combining means for combining said first pulse signal and said second pulse signal to form a switch control signal.

9. Apparatus according to claim 8; in which said gain control means includes gain reduction means for reducing the level of said focusing error signal and control means for controlling said gain reduction means to reduce the level of said focusing error signal in response to said switch control signal.

10. Apparatus according to claim 9; in which said gain reduction means includes current divider means adapted to be connected to said focus control means for reducing the level of said focusing error signal supplied thereto, and said gain control means further includes switch means for connecting said current divider means to said focus control means in response to said switch control signal to reduce the level of said focusing error signal.

11. Apparatus according to claim 8; in which said combining means includes OR gate means having first and second inputs supplied with said first pulse signal and said second pulse signal, respectively, to produce said switch control signal.

* * * * *